United States Patent [19]

Cattelani

[11] 4,372,667
[45] Feb. 8, 1983

[54] MANUAL ADDITIVE LAMPHOUSE FOR AERIAL IMAGES OF CAPTION STANDS AND OPTICAL PRINTERS

[76] Inventor: Claude Cattelani, 1, Square de la Mayenne, F-75017 Paris, France

[21] Appl. No.: 254,207

[22] Filed: Apr. 14, 1981

[30] Foreign Application Priority Data

Jan. 8, 1981 [FR] France ............................ 81 00198

[51] Int. Cl.³ .................... G03B 27/00; G03B 27/32; G03B 27/52
[52] U.S. Cl. ........................... 355/1; 354/4; 355/32
[58] Field of Search ................. 355/1, 32, 35, 67; 354/4

[56] References Cited

U.S. PATENT DOCUMENTS 3,519,347 7/1970 Bowker et al. .................. 355/384
4,129,372 12/1978 Allgeier ............................ 355/1
4,319,830 3/1982 Roach .............................. 355/1

FOREIGN PATENT DOCUMENTS 2215159 10/1972 Fed. Rep. of Germany .......... 355/1

*Primary Examiner*—Richard A. Wintercorn
*Attorney, Agent, or Firm*—Young & Thompson

[57] ABSTRACT

The lamphouse comprises a white-light source and a primary optical fiber subdivided into three secondary fibers for guiding the white light from the source through an optical system comprising rotatable disks fitted with peripheral lenses having graduated neutral gray densities. Any one lens or pair of lenses can be positioned on the path of one of the three beams emerging from the secondary optical fibers in order to dose to the required value the red, blue or green primary color to be selected by any one of three dichroic exit mirrors.

12 Claims, 6 Drawing Figures

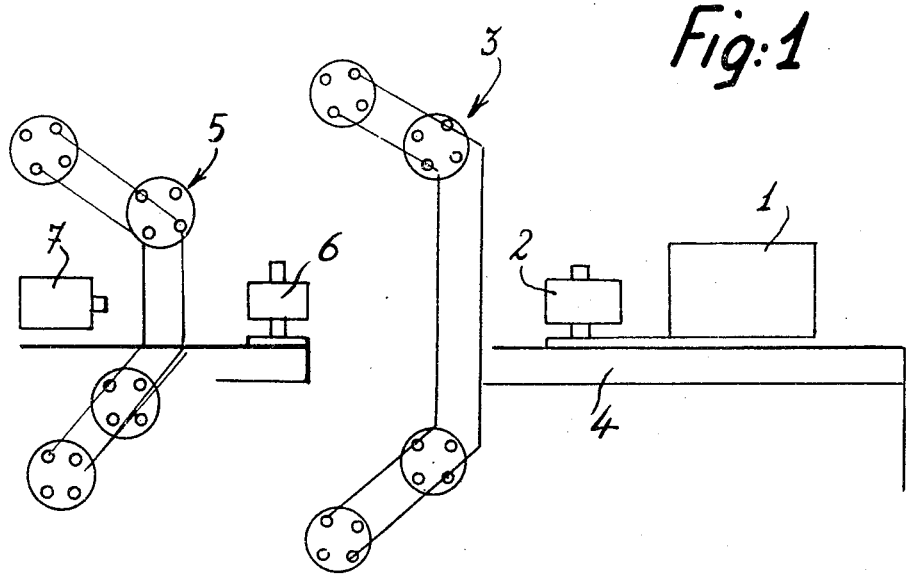
Fig:1
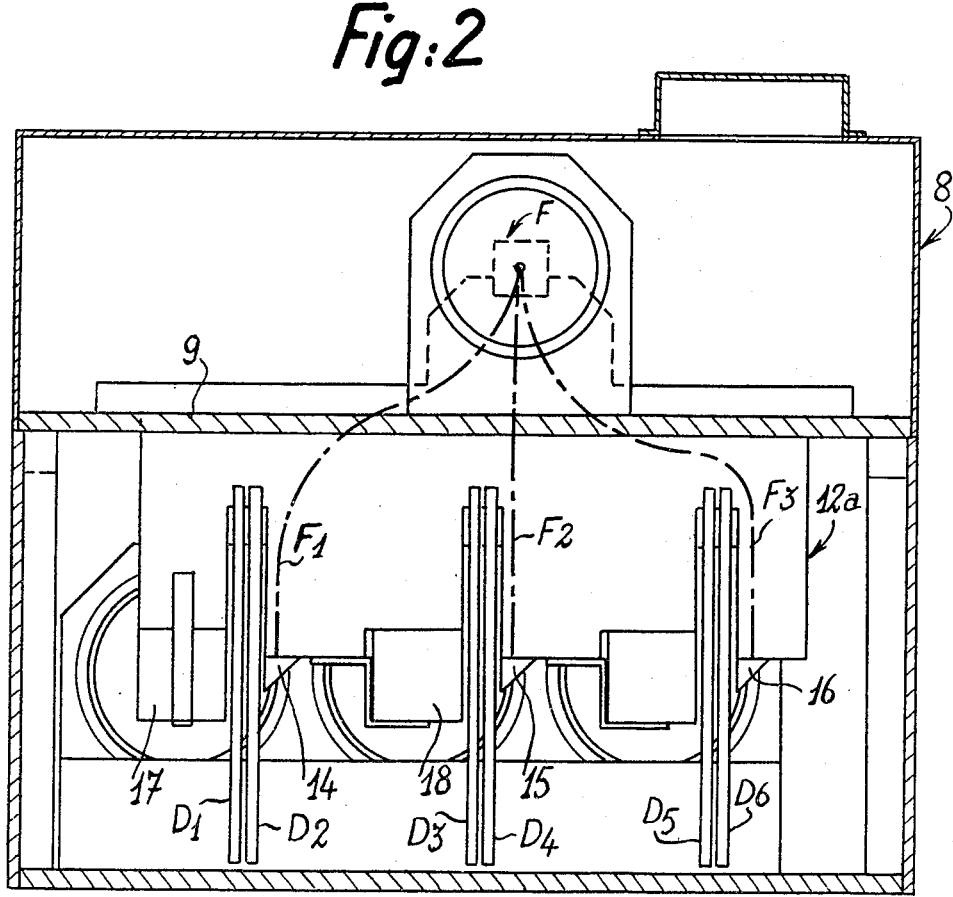
Fig:2

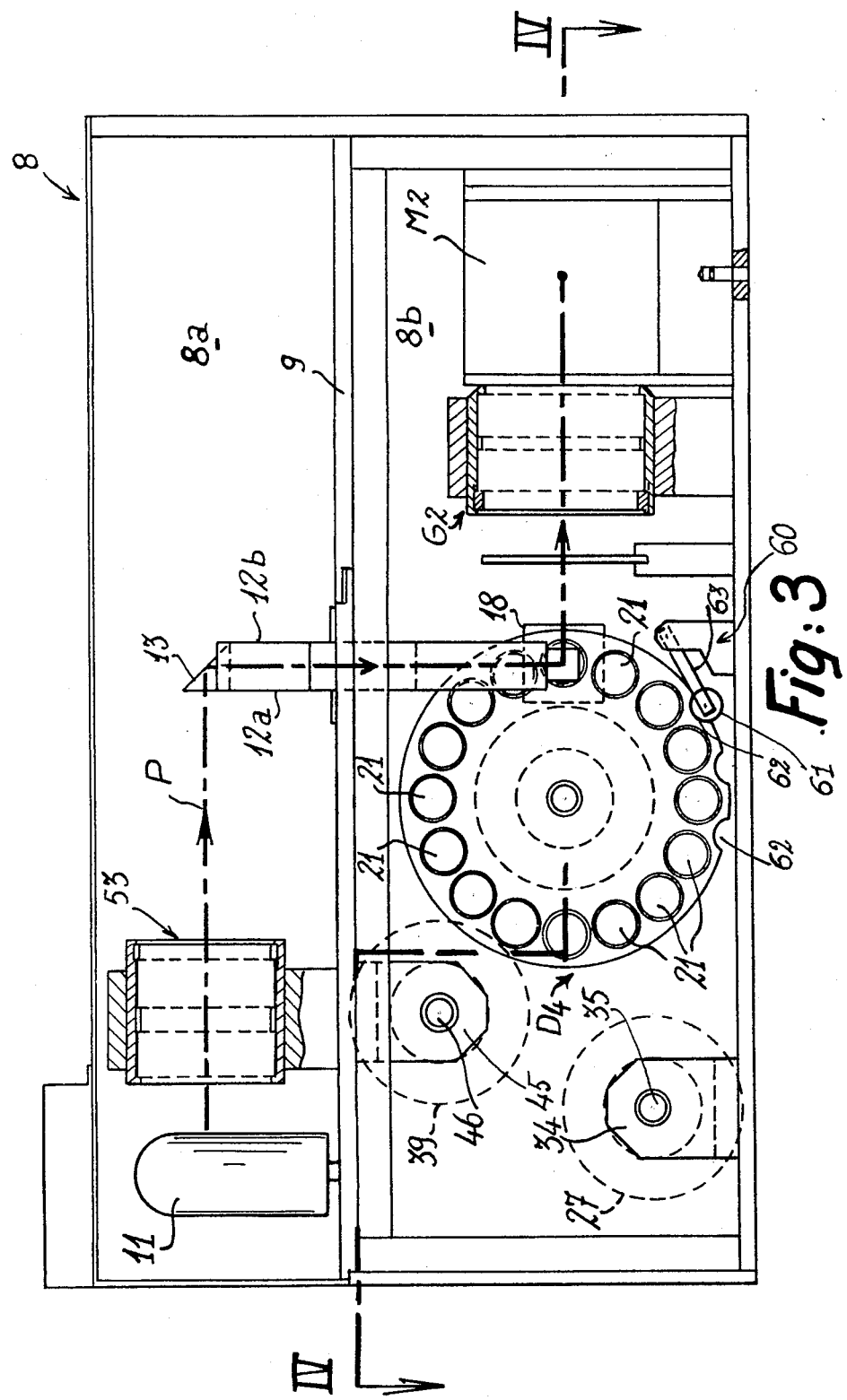

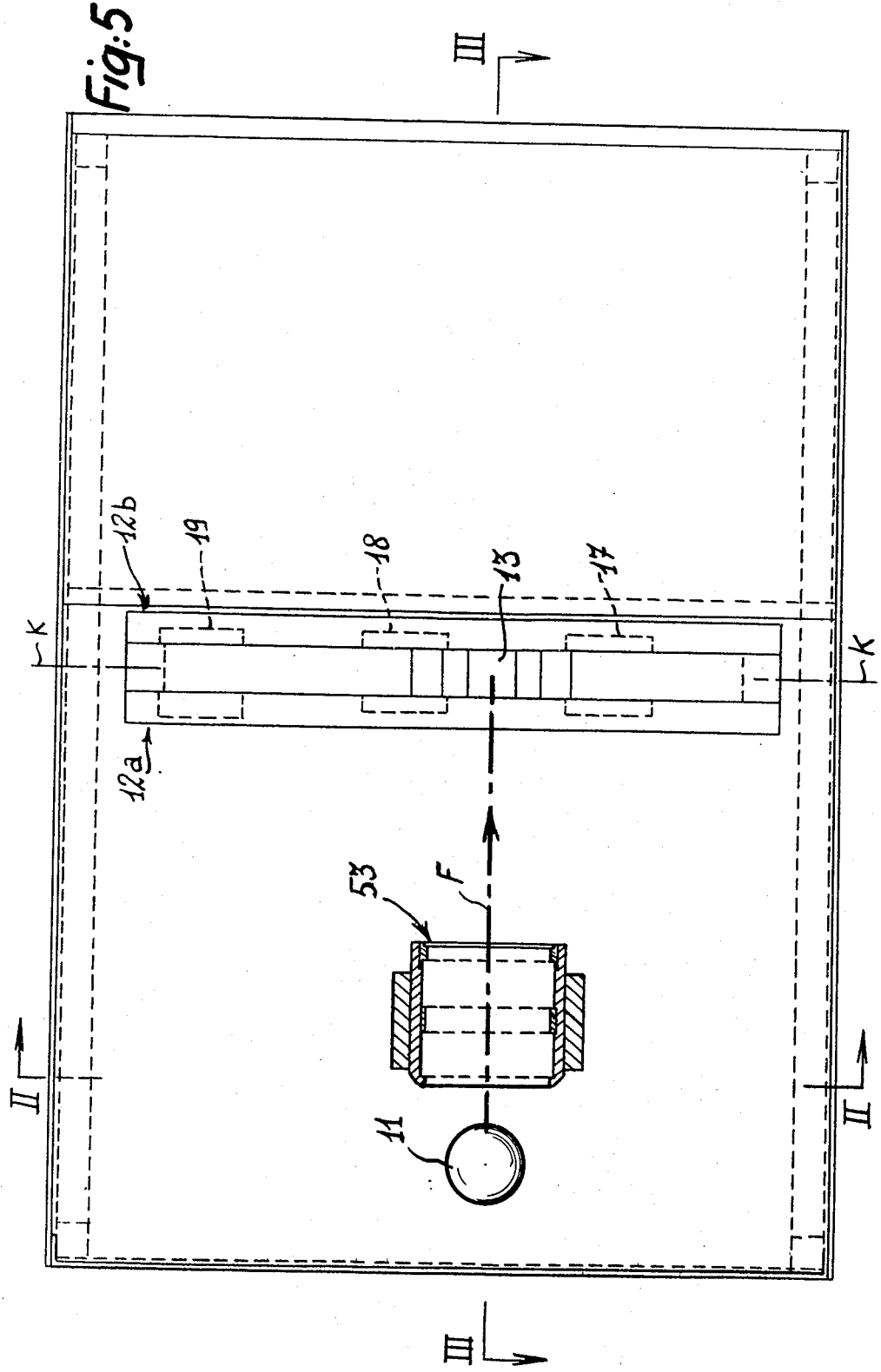

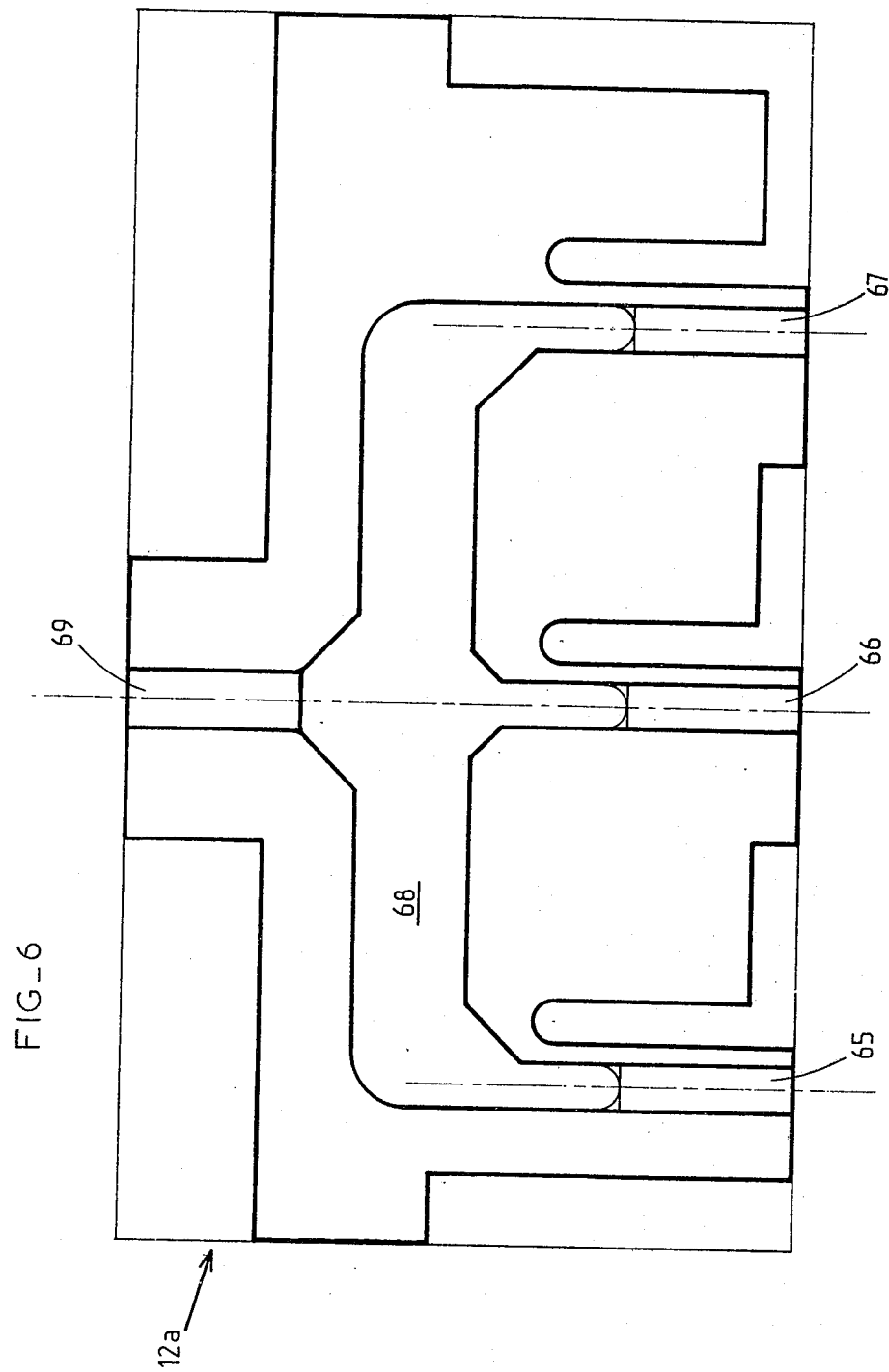

MANUAL ADDITIVE LAMPHOUSE FOR AERIAL IMAGES OF CAPTION STANDS AND OPTICAL PRINTERS

This invention relates to an additive manual lamphouse for aerial images of caption stands and optical printers, comprising a white light source and a suitable optical system.

It is known that "optical printers" or "caption stands" are devices for the production of special effects on films. A conventional optical printer thus consists of a camera, a main projector and an aerial projector. Since the only stationary element is the main projector, the camera and its objective are capable of forward and backward travel, namely in the forward direction for enlargements and in the backward direction for reductions. The plane of sharpness of the objective is determined on the main projector.

The aerial projector and its objective are capable of forward and backward travel, namely in the forward direction for reductions and in the backward direction for enlargements, the plane of sharpness of the objective being determined on the main projector.

Either for enlargements or reductions, it is possible to combine the displacements of the aerial projector and its objective with the camera as well as its objective.

In order to obtain backgrounds of different colors on the film, filters of different colors are placed in front of a lamp.

Should it be desired to avoid the use of this somewhat inconvenient method and to incorporate an additive lamphouse with the optical printer, said lamphouse must be placed behind the aerial projector. In this case, its light beam will be associated with the aerial projector and will undergo displacements at the same time as this latter. When displacing the different elements of the optical printer, it is clearly very difficult under these conditions to combine all the light beams of a lamphouse within the pupil of an objective such as an aerial projector objective of 150 mm, for example, and a camera objective of 103 mm, for example.

A certain number of additive lamphouses employed either on optical printers or contact printers are already known. Printers of this type do not have any moving element and consequently have a fixed-focus lens, with the result that provision has to be made for a lamphouse exit condenser which covers the pupil of an objective or the surface of an image.

Lamphouses of this type are heavy (approximately 80 kgs) and of large bulk, with the result that it is not possible in practice to install them on the aerial projector of an optical printer which has not been designed to carry a weight of this order.

The only possibility of achieving such an installation would be to immobilize the aerial projector and to add a support. However this would have the effect of removing an essential element from the machine and would therefore constitute an unacceptable drawback.

It would on the other hand be possible to employ this type of lamphouse in the case of an optical printer composed solely of a camera and a main projector. Since the main projector is stationary, its support may in fact be employed for placing a lamphouse thereon. However, by thus installing a conventional lamphouse on an optical printer, a major problem arises. In fact, when the optical printer is adjusted to a ratio of 1:1 or in other words when the format photographed on the main projector is equal to the format recorded on the camera, a light-exit condenser is defined for the lamphouse and so designed as to project all the light rays within the pupil of the objective. But in order to carry out a reduction, for example, it is necessary to move the objective away from the ideal point and consequently to separate the blue-green-red light beams, thus making the system unserviceable. It is then necessary to change the light-exit condenser in order to cause all the light rays to converge again within the pupil of the objective.

Manipulations of this kind clearly do not permit continuous traveling shots and therefore also constitute a major obstacle to the use of a conventional lamphouse on an optical printer.

The aim of the invention is to solve this problem by providing a manual additive lamphouse which can be conveniently used on an optical printer or caption stand.

In accordance with the invention, the manual additive lamphouse comprises an optical fiber which is capable of guiding the white-light beam from the source into the optical system. Said optical system comprises means for selecting the three primary colors, namely red, blue and green, from the white light transmitted by the optical fiber, and means for separately dosing each color at the exit of the lamphouse.

Thus the principal feature of the invention lies in the application of an optical fiber to the transmission of a beam of white light within the additive lamphouse considered, thus offering a number of advantages which will be explained in detail hereinafter.

In one embodiment of the invention, the optical fiber is a primary fiber divided into three secondary fibers each capable of guiding a beam of white light within a corresponding optical group and, in the case of each white-light beam emerging from said group, the primary-color selecting means comprise a dichroic exit mirror for selecting one of the three primary colors.

The primary optical fiber is of square section, for example, of the same size as a lamp filament, and is divided so as to form three beams by means of a suitable mechanical support device.

Splitting of the primary fiber into three secondary beams makes it possible to obtain within each channel a light source which is of much smaller size than the original filaments and produces a much smaller angle of incidence on the exit dichroic mirrors. This permits a very appreciable reduction in dimensions and weight of the lamphouse and makes it possible to adapt this latter to all types of optical printers without any difficulty.

In accordance with another distinctive feature of the invention, the means for dosing each primary color comprise in the case of each secondary fiber at least one rotary disk which is mounted at the end of the corresponding secondary fiber and the periphery of which is fitted with a series of lenses having neutral gray densities graduated in accordance with a predetermined scale. Any one of these lenses can be positioned on the path of the white-light beam which emerges from the associated secondary optical fiber in order to dose to the required value the primary color which is to be selected by the corresponding dichroic mirror.

These and other features of the invention will be more apparent to those skilled in the art upon consideration of the following description and accompanying drawings, in which one embodiment of the invention is illustrated by way of example and not in any limiting sense, and in which:

FIG. 1 is a simplified general diagram of an optical printer equipped with a manual additive lamphouse in accordance with the invention;

FIG. 2 is a view of the lamphouse taken in transverse cross-section along line II—II of FIG. 5 and showing the primary fiber divided into three beams and the means adopted for dosing the densities of each primary color;

FIG. 3 is a longitudinal sectional view taken along line III—III of FIG. 5 and showing in particular the positioning of the optical fiber and of a disk for dosing one primary color;

FIG. 5 is an overhead plan view of the lamphouse of FIGS. 2 to 4;

FIG. 6 is a view in elevation of a lamphouse panel for supporting the primary optical fiber and the secondary fibers.

Figure 4:
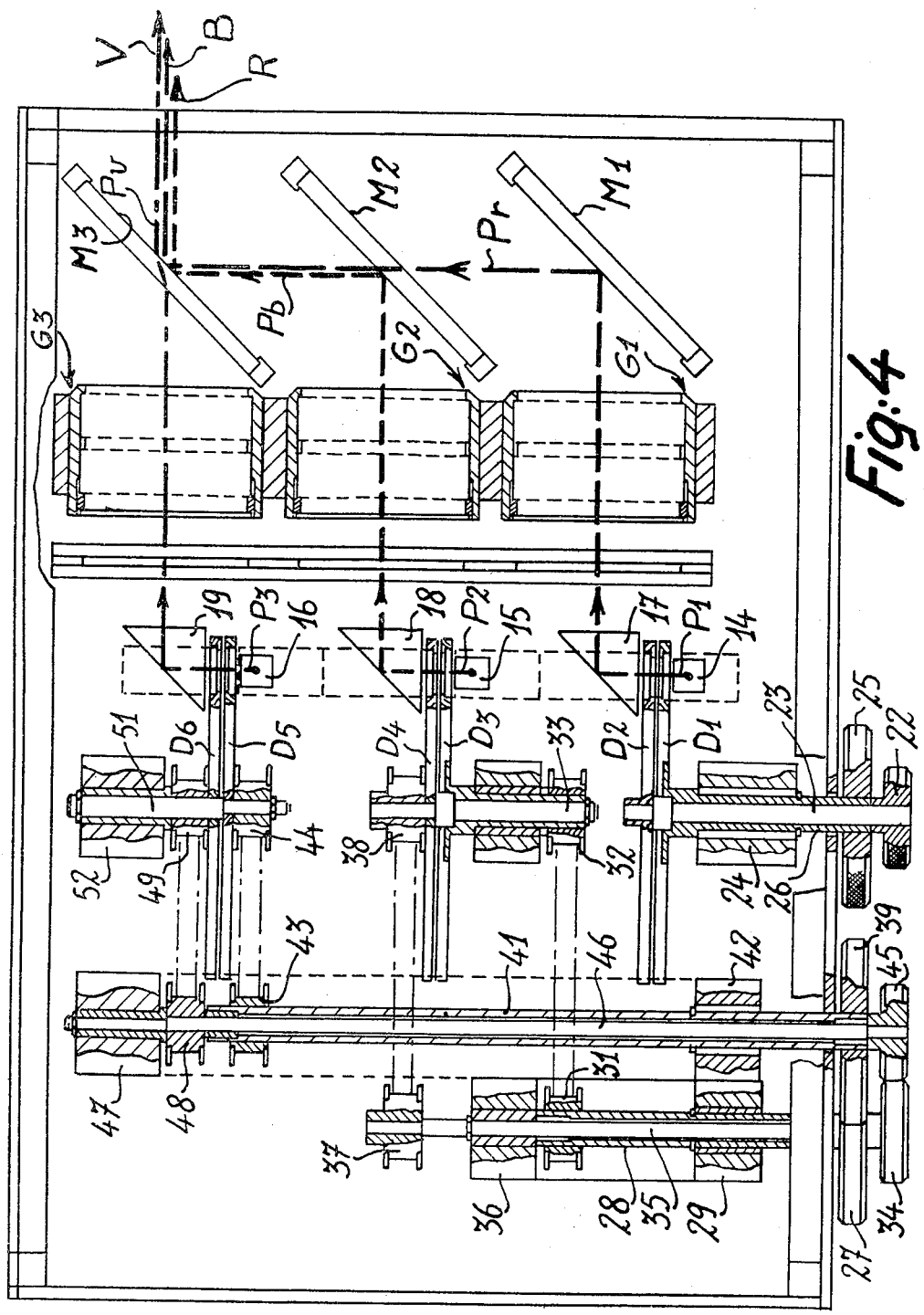
FIG. 4 is a view which is partly broken away and taken in horizontal cross-section along line IV—IV of FIG. 3.

There is shown diagrammatically in FIG. 1 an optical printer for producing special effects on films. The printer comprises a camera 1 provided with an objective 2, a main projector 3 fixed on a frame 4 and an aerial projector 5 fitted with an objective 6.

The only stationary element in this apparatus is the main projector 3. The camera 1 together with its objective 2 as well as the aerial projector 5 together with its objective 6 are capable of forward and backward displacement in order to permit the desired reductions or enlargements on the plane of sharpness of the objective 2. The operation of an optical printer of this type is well known and will not be considered further in the description which now follows.

The optical printer also comprises a manual additive lamphouse 7 which is contemplated by the invention and is placed behind the aerial projector 5.

The additive lamphouse 7 will now be described with reference to FIGS. 2 to 5.

Said lamphouse comprises a housing designated by the general reference 8 and having a parallelepipedal shape. Said housing is divided into two superposed compartments 8a, 8b separated by a horizontal partition-wall 9. There is placed within the upper compartment 8a a white-light source constituted by a lamp-bulb 11 which emits a horizontal light beam P. At the exit of the lamphouse, said light beam is intended to be split-up into three elementary beams each having one of the three primary colors: red, blue, green, which can subsequently be combined in many different ways in order to obtain the desired background color on the film of the camera 1, the white-light beam P being passed through a suitable optical system.

In accordance with the invention, the lamphouse comprises an optical fiber F which is capable of guiding the white-light beam P from the source 11 into the optical system. Means are provided in said optical system for selecting the three primary colors mentioned above from the white light transmitted by the optical fiber F. This latter is a primary fiber of square section in the example shown (in FIG. 2) and is divided into three secondary fibers F1, F2, F3 which are each capable of guiding a white-light beam within a corresponding optical group G1, G2, G3. As a complementary feature, the means for selecting the primary colors from the white-light beams which pass through the groups G1, G2, G3 are constituted by three respective dichroic exit mirrors M1, M2, M3 which are each capable of selecting one primary color. Thus the mirror M1 is assigned to red selection, the central mirror M2 is assigned to blue selection and the mirror M3 is assigned to green selection.

The primary fiber F and the secondary fibers F1, F2, F3 derived from the primary fiber are held mechanically between two vertical support panels 12a, 12b removably attached to each other, for example by means of a set of screws (not shown in the figure). One of the two support panels such as, for example, the panel 12a (shown in FIG. 6) is provided on its internal face with three parallel grooves (65, 66, 67) which open into a transverse milled recess 68. Said recess communicates with a fourth groove 69 located in the line of extension of the central groove 66.

The groove 69 is intended to receive the primary optical fiber F which is subdivided within the milled recess 68 into secondary fibers F1, F2, F3, said secondary fibers being inserted respectively into the grooves 65, 66, 67. The support panel 12b serves to maintain the fibers F, F1, F2, F3 in position. The mechanical support provided for the fibers F1, F2, F3 and constituted by the panels 12a, 12b is inserted in the horizontal partition-wall 9 (as shown in FIG. 3). The primary fiber F is located above the plane of said partition-wall and the fibers F1, F2, F3 are located below said plane.

The primary fiber F is placed in contact with one of the faces of a prism 13 which is so arranged as to be capable of reflecting the white-light beam P at right-angles and of guiding said beam through the three secondary fibers. Each lower end of said secondary fibers comes into contact with one face of a corresponding prism 14, 15, 16. By means of said prism, the white light transmitted by the associated secondary fiber F1, F2, F3 is intended to be reflected at right-angles in the form of a horizontal beam towards other complementary prisms 17, 18, 19 which are fixed on the bottom edge of the support panel 12b.

Means are also provided in accordance with the invention for dosing each primary color. In the example which is illustrated, these dosing means comprise two coaxial rotary disks for each secondary fiber F1, F2, F3. The vertical planes of said disks are perpendicular to the path of the white-light beams between the prisms 14, 15, 16 and 17, 18, 19. Two disks D1, D2 are placed between the prisms 14 and 17 from which a red-light beam is to be selected whereas two disks D3, D4 are placed between the prisms 15 and 18 from which the blue-light beam is to be obtained. Two additional and similar disks D5, D6 are positioned between the prisms 16 and 19 from which the green-light beam is to be selected.

All these disks D1 . . . D6 are mounted within the lower compartment 8b in coaxial relation and in such a manner as to ensure that their peripheral zones are located on the paths of the white-light beams which emerge from the ends of the fibers F1, F2, F3 and from the respective prisms 14, 15, 16.

Each disk D1, D2 . . . is provided at its periphery with a series of lenses 21 (as shown in FIG. 3) having neutral gray densities which are graduated in accordance with a predetermined scale. (It is worthy of note that one of these lenses may be dispensed with if necessary in order to allow the entire light beam to pass through the corresponding opening formed in the disk).

Any one of said lenses 21 may be positioned on the path of the white-light beam emerging from the corresponding secondary optical fiber (F1, F2, F3) in order to dose to the required value the primary color which is to be selected by the corresponding dichroic mirror (M1, M2, M3).

The first disk of each pair D1, D2-D3, D4-D5, D6 can be graduated for example from the density 0 to the density 15 in accordance with the following graduation: 15×0.025 log.E=0.375. In this example which is given by way of indication, the second disk of each pair can comprise eleven densities in steps of 0.400 in accordance with the following graduation: 16×0.025 log.E=0.400. The eleven densities range from 0 to 4000, thus representing a total of 160 possibilities of 0.025 log.E in each color.

It will be readily understood that provision can be made for disks having graduations corresponding to different densities with a correlative number of possible combinations.

Each disk D1, D2, and so on, is equipped with a mechanical device for driving the disk in rotation by hand. In the example illustrated in FIG. 4, it is thus apparent that the first disk D1 of the first pair can be driven in rotation by means of a knob located outside the housing 8 and rigidly fixed to a sleeve 26 which passes through a bearing 24 and the end of which is attached to the center of the disk D1. In regard to the second disk D2, this disk is driven in rotation by means of a second knob 22 rigidly fixed to a shaft 23 which is rotatably mounted within the interior of the sleeve 26 and the end of which is attached to the center of the disk D2.

The second pair of disks D3, D4 is actuated in the following manner: a manually-operated rotary knob 27 is rigidly fixed to the end of a sleeve 28 which passes through the wall of the housing 8 as well as through a bearing 29. The opposite end of said sleeve is adapted to carry a pulley 31 which is located in the same vertical plane as a second pulley 32, said second pulley being keyed on the end of a shaft 33 which is in turn rigidly fixed to the disk D3. A drive belt (not shown) is passed over the pulleys 31, 32 in order to transmit to the shaft 33 and to the disk D3 the movement of rotation of the knob 27 and of the driving sleeve 28.

The second disk D4 is rotated by means of a knob 34 fixed on the end of a shaft 35 which passes through the sleeve 28 as well as through the bearing 29 and through a second bearing 36. The end of the shaft 35 is adapted to carry a pulley 37 and this latter is intended to cooperate with a pulley 38 which is rigidly fixed to the disk D4 in coaxial relation thereto. As mentioned above in the case of the pulleys 31, 32, the movement of rotation of the shaft 35 is transmitted to the disk D4 by means of a drive belt (not shown) which is mounted on the pulleys 37, 38.

Finally, the movement of rotation of the third pair of disks D5, D6 is obtained in a similar manner: an external operating knob 39 is fixed on the end of a sleeve 41 which passes through a bearing 42 and the end of which is adapted to carry a pulley 43 for transmitting the movement of rotation of the sleeve 41 to a pulley 44 fixed in coaxial relation to the disk D5 by means of a drive belt (not shown). Finally, a knob 45 is fixed at the end of a shaft 46 which is capable of rotating within the sleeve 41. Said shaft-end is introduced in a rolling and supporting bearing 47 and adapted to carry a pulley 48. A drive belt (not shown) is mounted on said pulley 48 and on a pulley 49 secured to the center of the disk D6 coaxially with a supporting shaft 51 which is carried by a wall of the housing 8 and adapted to extend through a bearing 52.

Within the upper compartment 8a, a condenser 53 is interposed between the white-light source 11 and the first prism 13.

The lower compartment 8b which contains all the disks D1, D2 . . . , the secondary fibers F1, F2, F3, the optical groups G1, G2, G3 and the dichroic mirrors M1, M2, M3 is completely dustproof.

Consideration will now be given to the operation and the advantages of the additive lamphouse described in the foregoing.

The beam of white light emerging from the source 11 passes through the condenser 53, is then reflected by the prism 13 into the primary optical fiber F from which the three secondary fibers F1, F2, F3 guide the light separately up to the respective prisms 14, 15, 16. The beam of white light which emerges from the end of the corresponding secondary fiber is reflected by said prisms at an angle of 90° through the pairs of dosing lenses 21 which are adjusted to the final color desired by means of a choice of suitable lenses. Each horizontal beam P1, P2, P3 (FIG. 4) of white light is then again reflected at 90° by the respective prism 17, 18, 19 which returns the beam in the same direction as the initial beam P through the optical groups G1, G2, G3. At the exit of said groups, each beam is received on the corresponding dichroic mirror M1, M2, M3 which selects respectively a red-light beam Pr, a blue-light beam Pb, and a green-light beam Pv (as shown in FIG. 4).

The mirrors M1 and M2 are positioned in such a manner as to ensure that the beams emerging from the groups G1, G2 have an incidence of 45°, the corresponding red and blue beams Pr and Pb respectively being reflected through an angle of 90°, then again reflected through 90° from the mirror M3. The white-light beam emerging from the group G3 is refracted in the mirror M3 which delivers a beam of green light.

The three beams of primary colors (red R, blue B and green V) which are reflected from the mirror M3 can then be combined in a manner known per se in order to obtain the required color background on the film to be exposed.

As mentioned earlier, the separation of the primary fiber F so as to form three beams F1, F2, F3 makes it possible to obtain for each beam a light source which is of much smaller size than the original filament and produces a smaller angle of incidence on the exit mirrors M1, M2, M3. In consequence, the weight and the dimensions of the different pairs of disks D1, D2 . . . having neutral gray densities and consequently of the lamphouse may be reduced to a very substantial extent.

Under these conditions, the lamphouse can be readily adapted to all types of optical printers.

Another important advantage of the additive lamphouse in accordance with the invention lies in the fact that the use of an optical fiber dispenses with the need for a considerable number of adjustments, facilitates superimposition of three primary colors and retains homogeneity of white light in the event of displacements of the objectives 2, 6 of the camera 1 and of the aerial projector 5. In point of fact, this advantageous result is not obtained with the usual tungsten filament lamp, the parasitic image of which reappears in the optical system.

The interposition of the pairs of disks D1, D2 . . . provided with neutral gray densities between the exits of the secondary fibers F1, F2, F3 and the entrances of the optical groups G1, G2, G3 permits separate dosing of each value in each color by means of a suitable combination of the densities which are distributed on the periphery of the disks.

The use of a large quantity of optical fibers assembled together in a primary fiber having the size of a lamp filament makes it possible at the point of emergence of the three beams F1, F2, F3 to project a uniform light on the film instead of the lamp filament.

Apart from these major advantages, the additive lamphouse in accordance with the invention has a "light selection" compartment 8b which is completely dust-proof: this is a very important feature for neutral grays and dichroic glasses since the smallest dust deposit on these optical elements may produce an appreciable variation in the light density.

Finally, a further advantage related to the use of an optical fiber in the lamphouse lies in the fact that the light which impinges upon the film is a cold light.

The invention is not limited to the embodiment described in the foregoing and may accordingly extend to a large number of alternative forms of construction. It would thus be possible to install only one light-dosing disk at the exit of each secondary fiber F1, F2, F3 instead of two disks. It remains evident, however, that the number of combinations permitted by the use of a single disk would be much smaller than in the case of a pair of disks. Similarly, the mechanical system for driving the disks in rotation can be replaced by any equivalent means, and the cross-section of the primary fiber F need not necessarily be square but could be of round shape, for example.

It will be noted that each disk D1 . . . can be maintained in the angular position chosen by means of a resilient system 60 (shown in FIG. 3) comprising an arm 61 urged by a spring 63 into a peripheral notch 62 of the disk.

What is claimed is:

1. A manual additive lamphouse for aerial images of caption stands and optical printers, comprising a white-light source and a suitable optical system, wherein said lamphouse comprises an optical fiber means which is capable of guiding the white-light beam from the source into the optical system, said system being provided with means for selecting the three primary colors, namely red, blue and green, from the white light transmitted by the optical fiber means, and means for separately dosing each color at the exit of the lamphouse.

2. A manual additive lamphouse for aerial images of caption stands and optical printers, comprising a white-light source and a suitable optical system, wherein said lamphouse comprises an optical fiber means which is capable of guiding the white-light beam from the source into the optical system, said system being provided with means for selecting the three primary colors, namely red, blue and green, from the white light transmitted by the optical fiber means, and means for separately dosing each color at the exit of the lamphouse, the optical fiber means being a primary fiber means divided into three secondary fiber means each capable of guiding a beam of white light within a corresponding optical group and, in the case of each white-light beam emerging from said group, the primary-color selecting means comprises a dichroic exit mirror for selecting one of the three primary colors.

3. A lamphouse according to claim 2, wherein the primary fiber means and the secondary fiber means are maintained between two support panels which are removably attached to each other and on which are fixed on the one hand an entrance prism for reflecting the white-light beam into the primary fiber means and on the other hand complementary prisms at each of the exit ends of the secondary fiber means for reflecting the white light to the corresponding dichroic mirrors, and the lamphouse comprises a housing on which are fixed the fiber means support formed by the panels, as well as the means for manually dosing each primary color.

4. A lamphouse according to claim 3, wherein the means for dosing each primary color comprise in the case of each secondary fiber means at least one rotary disk which is mounted at the end of the corresponding secondary fiber means and the periphery of which is fitted with a series of lenses having neutral gray densities graduated in accordance with a predetermined scale, any one of said lenses being positioned according to requirements on the path of the white-light beam which emerges from the associated secondary optical fiber means in order to dose to the required value the primary color which is to be selected by the corresponding dichroic mirror.

5. A lamphouse according to claim 4, wherein two disks each fitted with a series of lenses for adjusting light densities are mounted coaxially at the exit end of each secondary fiber means in order to permit a combination of dosing possibilities of each disk.

6. A lamphouse according to claim 5, wherein each pair of disks is placed between two prisms so arranged as to transmit the white-light beam delivered by the secondary fiber means to the corresponding dichroic mirror through an optical group.

7. A lamphouse according to claim 4, wherein each disk is equipped with a manual rotation device constituted by a knob rigidly fixed to a rotary shaft, the end of said shaft being either attached to the center of the corresponding disk or adapted to carry a pulley associated with a second pulley rigidly fixed in coaxial relation to the corresponding disk, a transmission belt being mounted on the two pulleys aforesaid in order to transmit the movement of rotation of the knob and of the drive shaft to the disk.

8. A lamphouse according to claim 2, wherein the dichroic mirrors, the optical groups placed in front of said mirrors and the means for dosing the densities of each primary color are mounted within a completely dust-proof compartment of the housing.

9. A lamphouse according to claim 1, wherein the optical fiber means has a square cross-section.

10. A lamphouse according to claim 3, wherein the primary optical fiber means and the secondary optical means are inserted in grooves formed in one of the support panels.

11. A lamphouse according to claim 2, and in which each of said primary and secondary fiber means comprises a bundle of optical fibers.

12. A lamphouse according to claim 1, in which said optical fiber means comprises a bundle of optical fibers.

* * * * *